US010270738B1

(12) United States Patent
Kuo et al.

(10) Patent No.: US 10,270,738 B1
(45) Date of Patent: *Apr. 23, 2019

(54) AGGREGATED GROUP STATE FOR A GROUP OF DEVICE REPRESENTATIONS

(71) Applicant: Amazon Technologies, Inc., Seattle, WA (US)

(72) Inventors: Calvin Yue-Ren Kuo, Mercer Island, WA (US); William Alexander Stevenson, Seattle, WA (US); James Christopher Sorenson, III, Seattle, WA (US); Shyam Krishnamoorthy, Redmond, WA (US); Jonathan I. Turow, Seattle, WA (US); Mark Edward Rafn, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 42 days.

This patent is subject to a terminal disclaimer.

(21) Appl. No.: 15/269,715

(22) Filed: Sep. 19, 2016

(51) Int. Cl.
*H04L 15/16* (2006.01)
*H04L 29/12* (2006.01)
*H04L 29/08* (2006.01)

(52) U.S. Cl.
CPC ...... *H04L 61/2069* (2013.01); *H04L 61/2076* (2013.01); *H04L 67/12* (2013.01)

(58) Field of Classification Search
CPC ......... H04L 67/12; H04L 67/16; H04L 67/20; H04L 67/26; H04L 67/28; H04L 67/2833; H04L 67/2842; H04L 61/2069; H04L 41/18; H04L 41/0893
USPC .......................... 709/213, 220, 221, 224, 226
See application file for complete search history.

(56) References Cited

U.S. PATENT DOCUMENTS

| 2013/0159451 | A1* | 6/2013 | Luciw | H04L 67/2842 709/213 |
| 2014/0241354 | A1* | 8/2014 | Shuman | H04L 67/16 370/390 |
| 2014/0244568 | A1* | 8/2014 | Goel | H04W 4/08 706/52 |

(Continued)

OTHER PUBLICATIONS

Serbanati A, Medaglia CM, Ceipidor UB. Building blocks of the internet of things: State of the art and beyond. InDeploying RFID-Challenges, Solutions, and Open Issues Aug. 17, 2011. IntechOpen. (Year: 2011) (Year: 2011).*

(Continued)

*Primary Examiner* — Ranodhi Serrao
*Assistant Examiner* — James N Fiorillo
(74) *Attorney, Agent, or Firm* — Thorpe North & Western, LLP.

(57) ABSTRACT

A technology is described for operating a device shadowing service that calculates an aggregated group state for a group of device representations. An example method may include receiving device states for devices represented using a group of device representations, where the devices connect over a network to a device shadowing service configured to manage the device states. In response to an event, device representations included in the group of device representations may be identified. Device states indicated by the device representations may be obtained and an aggregated group state for the group of device representations may be calculated using the device states indicated by the device representations.

18 Claims, 8 Drawing Sheets

(56) References Cited

U.S. PATENT DOCUMENTS

| | | | | |
|---|---|---|---|---|
| 2014/0244834 A1* | 8/2014 | Guedalia | ............... | H04L 67/16 709/224 |
| 2014/0244838 A1* | 8/2014 | Ryu | ............... | H04L 43/04 709/224 |
| 2015/0130957 A1* | 5/2015 | Berelejis | ............... | H04L 67/12 348/211.1 |
| 2015/0134761 A1* | 5/2015 | Sharma | ............... | H04L 67/26 709/207 |
| 2015/0237071 A1* | 8/2015 | Maher | ............... | H04L 63/20 726/1 |
| 2015/0249672 A1* | 9/2015 | Burns | ............... | H04L 12/66 726/4 |
| 2015/0256385 A1* | 9/2015 | Chandhok | ............... | H04L 41/18 715/734 |
| 2015/0319046 A1* | 11/2015 | Plummer | ............... | H04L 12/2807 715/736 |
| 2015/0365480 A1* | 12/2015 | Soto | ............... | H04L 12/2827 709/224 |
| 2016/0041534 A1* | 2/2016 | Gupta | ............... | G05B 13/0265 700/275 |
| 2016/0072638 A1* | 3/2016 | Amer | ............... | H04L 12/2818 398/106 |
| 2016/0165650 A1* | 6/2016 | Kim | ............... | H04W 12/06 370/329 |
| 2016/0249439 A1* | 8/2016 | Recker | ............... | H02J 9/02 |
| 2016/0285840 A1* | 9/2016 | Smith | ............... | H04W 4/70 |
| 2016/0364553 A1* | 12/2016 | Smith | ............... | G06F 21/105 |
| 2017/0063946 A1* | 3/2017 | Quan | ............... | H04L 67/20 |
| 2017/0083396 A1* | 3/2017 | Bishop | ............... | G06F 11/14 |
| 2017/0223130 A1* | 8/2017 | Profit | ............... | H04L 67/2842 |
| 2017/0284691 A1* | 10/2017 | Sinha | ............... | G05B 19/0426 |
| 2017/0311368 A1* | 10/2017 | Kandur Raja | ............... | H04W 76/14 |
| 2017/0322904 A1* | 11/2017 | Jenks | ............... | H04W 4/70 |
| 2018/0097651 A1* | 4/2018 | Guedalia | ............... | H04L 67/16 |

OTHER PUBLICATIONS

Guth J, Breitenbücher U, Falkenthal M, Leymann F, Reinfurt L. Comparison of IoT platform architectures: A field study based on a reference architecture. InCloudification of the Internet of Things (CIoT) Nov. 23, 2016 (pp. 1-6). IEEE. (Year: 2016) (Year: 2016).*

* cited by examiner

US 10,270,738 B1

AGGREGATED GROUP STATE FOR A GROUP OF DEVICE REPRESENTATIONS

RELATED APPLICATIONS

This application is related to U.S. Utility patent applications entitled "DYNAMIC GROUPING OF DEVICE REPRESENTATIONS" and "GROUP COMMAND MANAGEMENT FOR DEVICE GROUPS" filed concurrently on Sep. 19, 2016, and are incorporated by reference herein.

BACKGROUND

Electronic devices have become ever-present in many aspects of society. During the course of a normal day, a person may use a smart phone, a tablet device, and a laptop computer. Automobiles and commercial vehicles have also come to rely upon electronic systems to control and monitor many features and operations. Modern home appliances such as, washers, dryers, and refrigerators may be driven and controlled by electronic systems. Manufacturing facilities, building heating and cooling systems, and farming equipment may now rely upon electronic sensors and control systems.

Advancements in communication technologies have allowed for even relatively simple electronic devices to communicate with other devices and computing systems over a computer network. For example, an electronic device in a manufacturing system may monitor various aspects of the manufacturing process and communicate monitoring data to other devices in the manufacturing system. Similarly, electronic sensors embedded in a building control system may monitor and communicate details regarding operation of the building's heating, cooling, and ventilation systems. Even home appliances, doors, and light switches offer the possibility of being configured with communication capabilities for the purpose of transmitting status and receiving external control communications.

DETAILED DESCRIPTION

Figure 1:
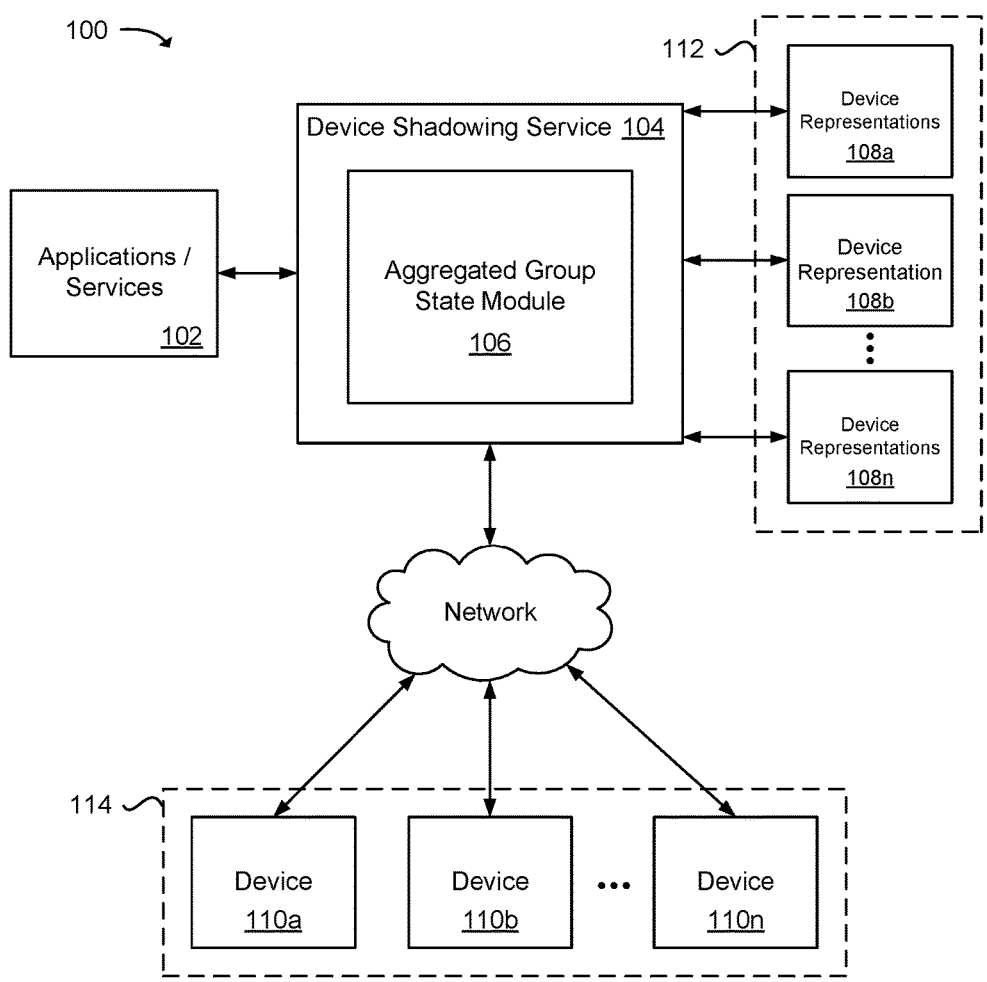
FIG. 1 is a block diagram illustrating an example system for managing groups of device representations and calculating aggregated group states for the groups of device representations.

A technology is described for determining an aggregated group state for a group of device representations managed using a device shadowing service. Device representations included in a group of device representations represent states of devices. A device may be one of many devices that create a large network of addressable devices. This entire "network" is commonly referred to as the Internet of Things (IoT). The devices may be network addressable and/or eventually addressable (e.g., capable of receiving relayed messages) by the device shadowing service configured to manage the device representations used to represent the states of the devices.

A device representation may represent one or more states of a device. As an example, a device representation may represent the fixed states (e.g., "lightbulb") and dynamic states (e.g., "on" or "off") of a device. Device representations may be grouped into groups of device representations based in part on one or more states represented by the device representations. As an example, a group of device representations may be grouped based on a device type (e.g., "lightbulb") and the current state of the device (e.g., "on").

An aggregated group state may be calculated for a group of device representations. In one example, the device shadowing service may be configured to calculate an aggregated group state for a group of device representations in response to an event (e.g., a change in group membership, a state change of a device representation, a schedule, etc.) or a request from a client of the device shadowing service. In response to an event or a request for an aggregated group state, the device shadowing service may be configured to identify device representations included in the group of device representations and obtain device states represented by the device representations included in the group. An aggregated group state may then be calculated using the device states obtained from the device representations and the aggregated group state may be provided to clients that request the aggregated group state.

As an example, an aggregated group state may be calculated for a group of network addressable lightbulbs by querying a group of device representations associated with the lightbulbs for device states. The device states obtained from the device representations may be aggregated to form an aggregated group state. Illustratively, the aggregated group state may indicate that 30% of the lightbulbs have a color state of "red", 40% have a color state of "white", and 30% have a color state "blue". The aggregated group state for the group of lightbulbs may be returned to a client requesting the aggregated group state.

Instead of querying devices directly to obtain the current states of the device, some of which may only be intermittently reachable for various reasons, the technology may be used to obtain device states from respective device representations that represent the last known states of the devices. Querying the device representations for the last known states of devices may result in generating a more complete aggregated state for a group of devices in a shorter amount of time as compared to querying the devices directly due to the possibility that a device is not reachable at the time that the device is queried or the device is slow in responding to the query.

FIG. 1 is a block diagram illustrating a high level example of a system 100 for managing groups of device representations 112 for which aggregated states may be calculated. The system 100 may include a device shadowing service 104 configured to manage device representations 108a-n that represent the states of devices 110*a-n*. As illustrated, the device shadowing service 104 may include an aggregated group state module 106 configured in part to calculate an aggregated group state for a group of device representations 112 using device states indicated by those device representations 108*a-n* included in the group of device representations 112.

A device representation 108*a-n* may be an electronic representation (e.g., a data object) of a device 110*a-n* that can be referenced via a computer network (e.g., the internet and a virtual network of a service provider environment) and updated, even at times that the device 110*a-n* itself may be unreachable. For example, to conserve power, some battery-powered and other devices 110*a-n* may disable wireless radios when not actively transmitting data to the device shadowing service 104 or may only enable their wireless radios when polling the device shadowing service 104 for updates. For these and other reasons, a device 110*a-n* may connect to a network only intermittently, while an application or service 102 may attempt to interact with the device 110*a-n* at times that the device 110*a-n* may not be connected to the network or may not otherwise be available. In order to overcome limitations associated with intermittent connectivity, network bandwidth, and/or computing capacity, the device shadowing service 104 may maintain a cached device representation 108*a-n* for a device 110*a-n* that allows an application and/or service 102 to access information, such as state information, for the device 110*a-n* at any time.

A device 110*a-n* may report state changes and other information for the device 110*a-n* to the device shadowing service 104, and the reported information may be stored within the device representation 108*a-n*. A device representation 108*a-n* may represent a state emitted by a device 110*a-n*, which may be any state assumed by the device 110*a-n* (e.g., "on" or "off", "open" or "closed") or detected by the device 110*a-n* via a sensor (e.g., location, temperature, or chemical composition). A device representation 108*a-n* may represent multiple states of a device 110*a-n*. As a specific example, a device representation for a device 110*a-n* that reports location, temperature, and humidity data may represent each state, (location, temperature, and humidity) reported by the device 110*a-n*.

Device representations 108*a-n* may be grouped into groups of device representations 112 based in part on one or more states represented by the device representations 108*a-n*. A group of device representations 112 may be static or dynamic. For example, a fixed state (e.g., device type) may be used to define a group of device representations 112, and a changeable state (e.g., "on" and "off") may be used to define a dynamic group of device representations 112 where changes to the state represented by a device representation 108*a-n* may result in the device representation 108*a-n* being added or removed from the dynamic group of device representations 112. As will be appreciated, any number of states may be combined to define a group of device representations 112. As an example, a changeable state and a fixed state may be used to define a group of device representations 112.

An aggregated state may be calculated for a group of device representations 112. An aggregated state may include one or more groupings of states indicated by the device representations 108*a-n* included in a group of device representations 112. As an illustration, an aggregated state for a group of device representations 112 may indicate a number of device representations 108*a-n* that have an "off" state and a number of device representations 108*a-n* that have an "on" state. Also, an aggregated state may comprise a statistical calculation generated using device states indicated by device representations 108*a-n* included in a group of device representations 112, including: an average, mean, median, or mode, standard deviation, geometric mean, grouped data arithmetic mean, class interval arithmetic mean, root mean square, correlation coefficient, regression calculation, harmonic mean, factorial, permutation and combination, probability, normal distribution, binomial distribution, negative binomial distribution, poisson distribution, and hypergeometric distribution. Device states used to calculate an aggregated group state may be normalized prior to calculating the aggregated group state. For example, device states comprising different units of measurement (e.g., Fahrenheit and Celsius) may be converted to a common unit of measurement.

As an illustration, an aggregated state for a group of device representations 112 representing a group of devices 114 that send temperature data to the device shadowing service 104 may be an average temperature calculated using the individual temperatures represented by the device representations 108*a-n* included in the group of device representations 112. As another illustration, an aggregated state may include grouped and categorized state information, such as average traffic patterns for street intersections located within a city.

In one example, the device shadowing service 104 may be configured to receive aggregated state requests from applications and/or services 102. The requests may be associated with a group of device representations 112 that represent a logical group of devices 114. As an example, an application or service 102 may request a group state for lights located on a specified floor of a building, or a group state for a fleet of delivery vehicles. In response to a request, a cached aggregated group state may be retrieved from memory or a data store and the aggregated group state may be returned to the application or service 102. In one example, in response to a request for an aggregated group state, device representations 108*a-n* included in a group of device representations 112 may be identified and device states indicated by each of the device representations 108*a-n* may be obtained and an aggregated group state may be calculated using the device states.

In one example, an API (Application Programming Interface) call for requesting an aggregated group state for a group of device representations 112 may be exposed to applications and/or services 102, enabling the applications and/or services 102 to request an aggregated group state for a group of device representations 108*a-n* from the device shadowing service 104. In another example, a publication/subscription service may be used to send requests for aggregated group states to the device shadowing service 104.

In one example, a group definition for a group of device representations 112 may be used to identify individual device representations 108*a-n* included in a group of device representations 112. A group definition may include a membership parameter that may be used to identify device representations 108*a-n* having one or more states that correspond to the membership parameter. For example, device representations 108*a-n* may be queried using one or more membership parameters included in a group definition and device states represented by device representations 108*a-n* identified as corresponding to the membership parameters may be returned in response to the query. In another example, device representations 108*a-n* may be identified using a group registry for a group of device representations 112 that includes identifiers for the device representations

108a-n. Identifiers for device representations 108a-n included in a group of device representations 112 may be used to query the device representations 108a-n for device states represented by the device representations 108a-n.

In some examples, a group definition for a group of device representations 112 may include a membership parameter that specifies authentication information needed to be included in the group of device representations 112. Authentication information may include, but is not limited to: a token, digital rights, a digital certificate and/or a public key of a public key-private key pair. In identifying or generating a group of device representations 112, authentication information may be used in combination with other membership parameters to query device representations and identify device representations associated with the authentication information. For example, customer authentication information may be used to identify device representations 108a-n that are accessible to a customer in response to a customer request for an aggregated group state.

Device states obtained for a group of device representations 112 may be provided to the aggregated group state module 106, which may be configured to calculate an aggregated state for the group of device representations 112 using the device states. In one example, an aggregated group state may include groupings of states. As an illustration, an aggregated group state that includes groupings of states may indicate that 78% of devices are "online" and 22% of devices are "offline". In another example, an aggregated group state may comprise a value calculated (e.g., a sum, average, mean, median, mode, etc.) using state output received from a group of devices 114. As an illustration, an aggregated group state may comprise a traffic count or traffic volume for a geographical area having devices 110a-n installed at intersections that monitor traffic and submit traffic values to the device shadowing service 104 so that the traffic values can be represented using device representations 108a-n. In yet another example, an aggregated group state may include a combination of grouped states and calculated values. As an illustration, an aggregated group state for moisture levels of agriculture plots at a farm operation may indicate that devices associated with a first plot report an average moisture level of 20 centibars; devices associated with a second plot report an average moisture level of 16 centibars; and devices associated with a third plot report an average moisture level of 23 centibars.

In one example, a group of device representations 112 may be divided into device representation subgroups, wherein subgroup states may be calculated for each of the device representation subgroups. The subgroup states may be aggregated to create an aggregated group state for the group of device representations 112, as described later in association with FIG. 7.

In an alternative example, a group representation (shown in FIG. 2) managed by the device shadowing service 104 may be used to represent a group of device representations 112. A group representation may represent an aggregated group state for a group of device representations 108a-n and may be queried to obtain the aggregated group state. For example, a group representation for a group of network addressable lightbulbs may represent an aggregated "on" state or an "off" state. The group representation may be queried to determine the last known state of the group of network addressable lightbulbs. The aggregated group state of a group representation may be periodically updated, or may be updated in response to events associated with the device representations 108a-n included in an associated group of device representations 112.

After calculating an aggregated group state for a group of device representations 112, the aggregated group state may be stored to memory or a data store and may be returned to an application and/or service 102 requesting the aggregated group state. In some examples, applications and/or services 102 may be notified when there is a change in an aggregated group state, or when a change in an aggregated group state exceeds a threshold, which may be set by a user or customer.

Illustratively, an application and/or service 102 may be configured to provide the aggregated group state to a user or customer for informational purposes, or in some cases, the aggregated group state may be analyzed by the application and/or service 102 resulting in triggering an event. As an example, an aggregated group state representing moisture levels for agriculture plots at a farm operation may be analyzed to determine whether moisture levels for the agriculture plots indicate that watering of individual plots may be needed. In the case that the analysis shows that one or more plots need watering, a notification event may be triggered resulting in irrigation being turned on for the plots identified as having low moisture levels.

Figure 2:
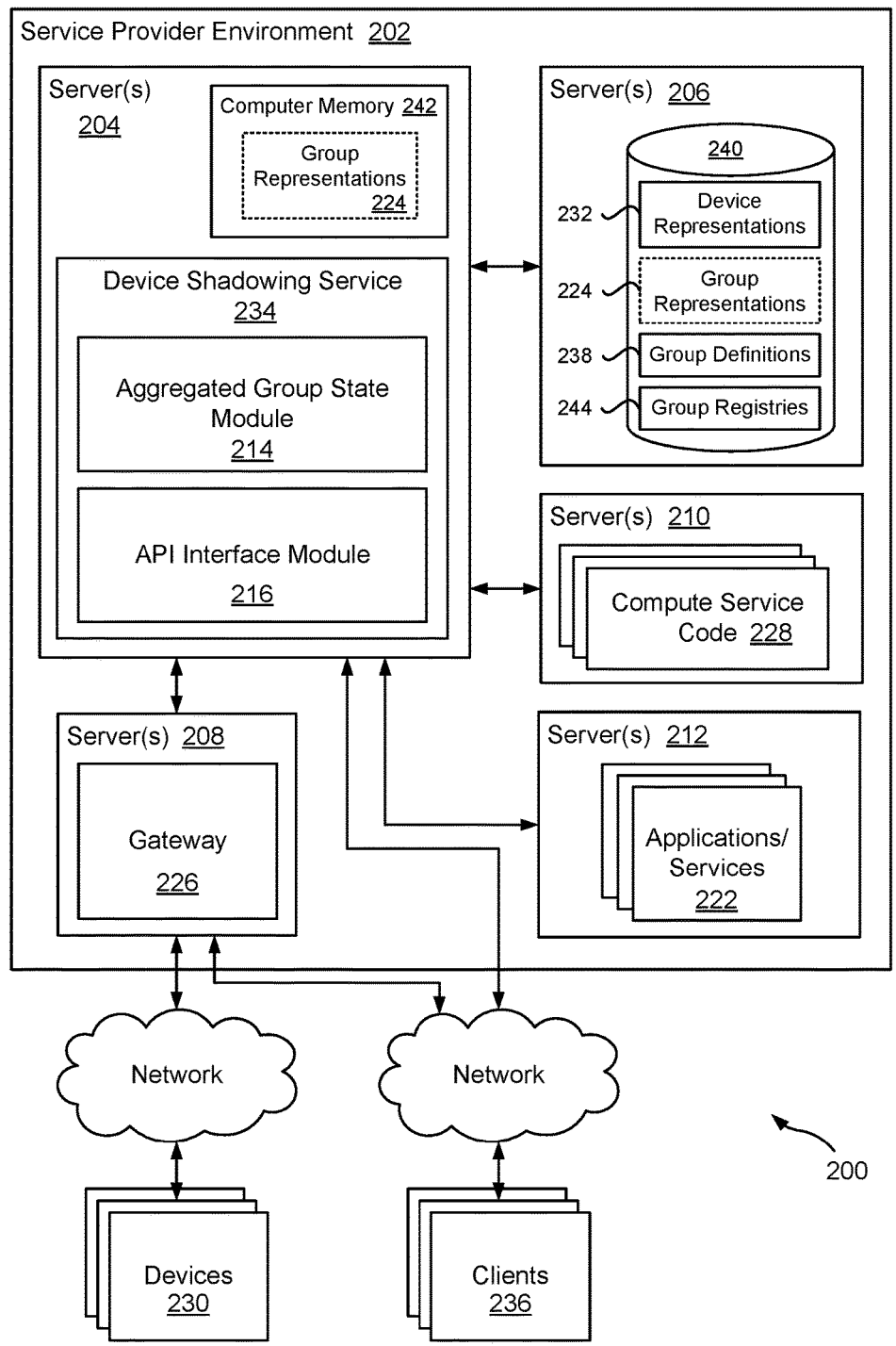
FIG. 2 is a block diagram that illustrates various example components included in a system for managing groups of devices using device representations.

FIG. 2 illustrates components of an example system 200 on which the present technology may be executed. The system 200 may include a plurality of devices 230 that are in communication with a service provider environment 202 via one or more networks.

Illustratively, the devices 230 may include connected: global positioning devices, temperature sensors, water sensors, light switches, light bulbs, power outlets, watches, media players, voice command devices, video cameras, security systems, door locks, smoke alarms, thermostats, weather sensors, vehicles, handheld devices, as well as any other device configured to communicate over a network.

The service provider environment 202 may include servers that host various components. A server 204 may host a device shadowing service 234 configured to manage device representations 232 associated with the devices 230. The device representations 232 may, in one example, include data objects stored using a data-interchange format like JSON (JavaScript Object Notation) or XML (eXtensible Markup Language) in an object data store, NoSQL data store, a relational data store or another type of data store. The device representations 232 may be accessible to clients 236 that may operate outside of the service provider environment 202, and applications and/or services 222 hosted on a server 212 within the service provider environment 202 via the device shadowing service 234 at any time without the need to wake up or otherwise contact an associated device 230.

The device shadowing service 234 may be configured to manage device states represented by the device representations 232. For example, the device shadowing service 234 may update a device state represented by a device representation 232 in response to state change requests received from clients 236 and/or applications and services 222, or in response to output received from the devices 230 represented by the device representations 232. In one example, a device representation 232 may represent a device state as a recorded state and a desired state. The recorded state may be the last know state of the device 230 represented by the device representation 232, and the desired state may be a state to which the device 230 may be instructed to assume. For example, a client 236, application and/or service 222 may request that a device 230 assume a desired state. In response, the device shadowing service 234 may be configured to update the desired state of a device representation 232 that represents the device 230 to the desired state. The device 230 may then be instructed to assume the desired state. Thereafter, an indication that the device 230 assumed the desired state may be received and the recorded state of the device representation 232 may be updated to the state assumed by the device 230. In one example, the recorded state of a device representation 232 may be used to identify device representations 232 included in a group of device representations, for which an aggregated group state may be calculated and provided to the clients 236, applications and services 222.

In one example, the device shadowing service 234 may include an API interface module 216, an aggregated group state module 214, and other modules. The API interface module 216 may be configured to provide clients 236, applications and/or services 222 with an endpoint to the device shadowing service 234 exposing an API call to clients 236, applications and/or services 222 that may be used to request an aggregated group state associated with a group of device representations. Requests made to the device shadowing service 234 via the API interface module 216 may be authenticated using an identity and access management service (not shown) hosted in the service provider environment 202. For example, security authentication may be performed for aggregated group state requests to ensure that a customer is assigned permissions that allow the customer to obtain an aggregated group state for a group of device representations.

In another example, aggregated group state requests may be sent to the device shadowing service 234 using messages published by clients 236, applications and/or services 222 to named logical channels associated with groups of device representations. The service provider environment 202 may include a server 208 that hosts a gateway 226 configured to exchange messages using a publication/subscription broker service, which enables one-to-one and one-to-many communications. A one-to-many communication pattern may allow an exchange of messages between the device shadowing service 234, devices 230, clients 236, applications and services 222, as well as other components subscribed to receive the messages. For example, a component may publish a message to a named logical channel (e.g., topic) and the message may be distributed to subscribed system components. The gateway 226 may support protocols that include MQTT (Message Queue Telemetry Transport), CoAP (Constrained Application Protocol), HTTP (Hyper Text Transport Protocol), or HTTPS (Hyper Text Transport Protocol Secure) protocols, as well as proprietary or legacy protocols. The gateway 226 may be configured to scale automatically to support a number of devices 230 (thousands, millions, or even billions) using computing resources included in the service provider environment 202.

Requests for aggregated group states received at the device shadowing service 234 via the API interface module 216 or a named logical channel may be provided to the aggregated group state module 214 configured to handle aggregated group state requests. In one example, the aggregated group state module 214 may be configured to identify device representations 232 included in a group of device representations using a group definition 238 or group registry 244. A request for an aggregated group state may include a group identifier that may be used to identify a group definition 238 or group registry 244 associated with the group identifier. A group definition 238 may include one or more membership parameters that may be used to identify device representations 232 included in a group of device representations. In one example, a group definition may be used to generate a dynamic group of device representations by using membership parameters provided by the group definition 238 to identify device representations 232 that represent device states that correspond to the membership parameters. A group registry 244 may include identifiers or addresses for device representations 232 included in a group of device representations. The identifier or addresses may be used to reference device states represented by the device representations 232.

The aggregated group state module 214 may be configured to obtain device states represented by device representations 232 identified as being included in a group of device representations defined by a group definition 238 or included in a group registry 244. For example, the aggregated group state module 214 may be configured to query the device representations 232 for a device state represented by the device representations 232. The device states obtained from the device representations 232 may be used to calculate an aggregated group state for the group of device representations and the aggregated group state may be provided to the requesting client 236, application or service 222 associated with the aggregated group state request via the API interface module 216 or a named logical channel.

In another example, the aggregated group state module 214 may be configured to identify a group definition 238 for a group of device representations in response to an aggregated group state request and provide the group definition 238 to an instance of a compute service code 228 hosted on a server 210. An instance of a compute service code 228 may include a segment of program code that may be like a function, and the program code may receive parameters, perform processing, and provide return values. In one aspect, the compute service code may execute on a managed compute service code platform for back-end web services that runs a defined compute service code on a computing instance hosted in a service provider environment as described in relation to FIG. 4. That is, the compute service code 228 may execute in a compute service that runs code in response to requests to execute the compute service code 228, and automatically manage the compute resources used by that compute service code 228. Once a compute service code 228 has been executed and results have been returned, the compute service code 228 and results may be removed from the memory of a computing instance or software container used to execute the compute service code 228. The compute service code 228 provides for building smaller, on-demand applications that may be responsive to events and new information.

An instance of compute service code 228 may be configured to obtain device states represented by device representations 232 using a group definition 238 to identify the device representations 232 and calculate an aggregated group state for a group of device representations defined by the group definition 238. The aggregated group state may be returned to the device shadowing service 234 which may then send the aggregated group state to a client 236, application or service 222 that requested the aggregated group state.

In yet another example, the aggregated group state module 214 may be configured to query a group representation 224 for an aggregated group state in response to an aggregated group state request. A group representation 224 may represent an aggregated group state for a group of device representations. For example, a group representation 224 may be a data object configured to represent an aggregated last known group state for a group of devices 230. As one specific example, a group representation 224 for a group of temperature sensors may represent an aggregated temperature calculated using temperature data obtained from device representations 232 associated with the temperature sensors. As another specific example, a group representation 224 for a group of lightbulbs may represent aggregated "on" and "off" states obtained from device representations 232 associated with the lightbulbs.

A group representation 224 may be managed by the device shadowing service 234 and may be queried by the aggregated group state module 214 to obtain the aggregated group state represented by the group representation 224. Also a group representation 224 may be stored in either computer memory 242 or a data store 240, and the group representation 224 may be updated to include the last know states of devices 230 represented by the device representations 232 included in a group of device representations. For example, an aggregated group state represented by a group representation 224 may be updated periodically, and/or in response to an event that changes a device state represented by a device representation 232 included in an associated group of device representations.

The various processes and/or other functionality included in the system 200 may be executed on one or more processors that are in communication with one or more memory modules. The system 200 may include a number of servers that are arranged, for example, in one or more server banks or computer banks or other arrangements. The servers may support the service provider environment 202 using hypervisors, virtual machine monitors (VMMs) and other virtualization software as described later in association with FIG. 4.

Device representations 232, group representations 224, group definitions 238, and group registries 244 may be stored in one or more data stores 240 hosted by servers 206. In one example, a key value data store may be used to store device representations 232. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to the modules and services included in the service provider environment 202 and may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

One or more networks used by the system 200 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
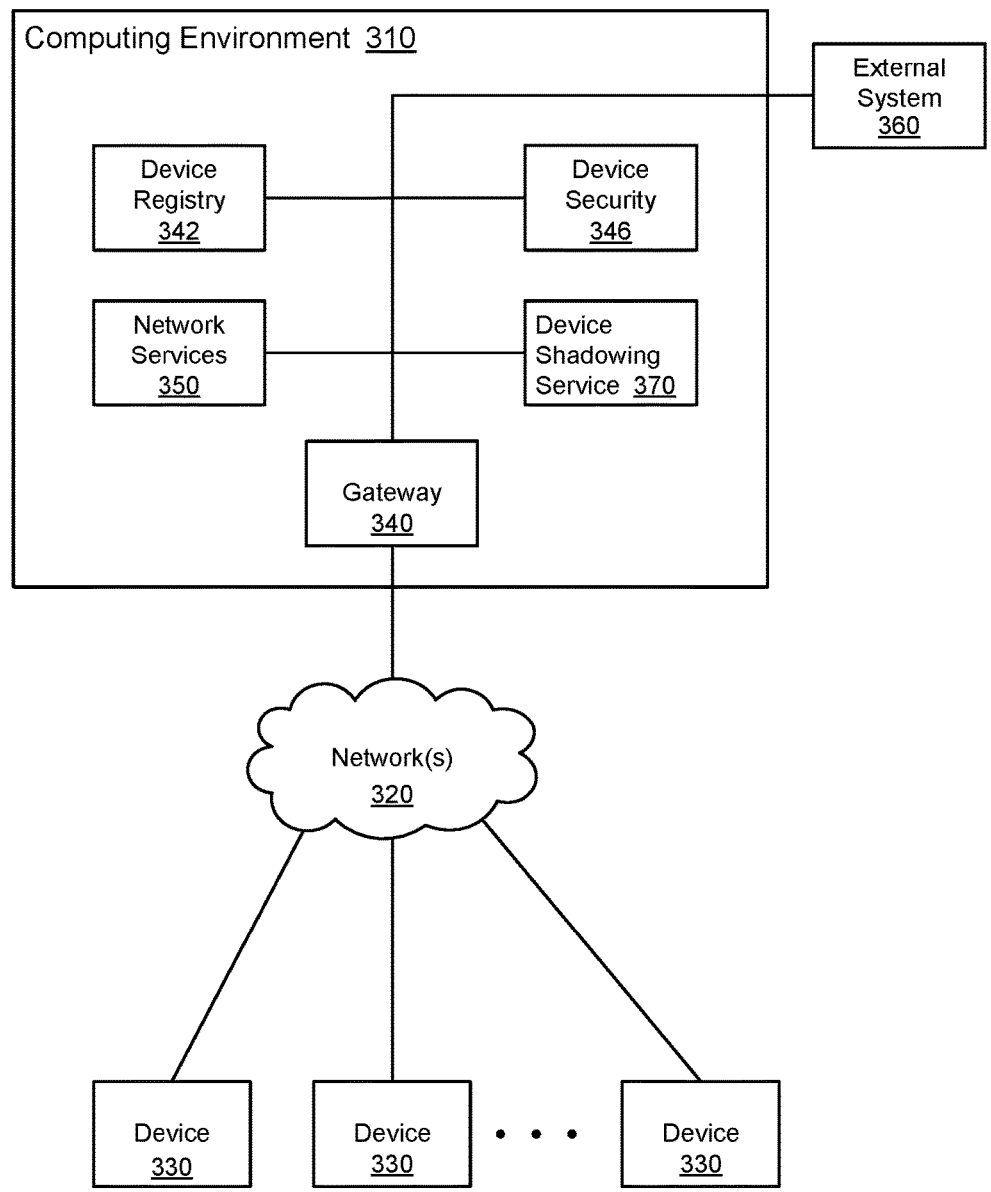
FIG. 3 is a block diagram illustrating an example computer networking architecture for providing devices access to network services.

FIG. 3 is a block diagram illustrating an example service provider environment 310 with which the devices 330 described earlier may communicate. The service provider environment 310, which may be referred to as a device communication environment or system that comprises various resources made accessible via a gateway server 340 to the devices 330 that access the gateway server 340 via a network 320. The devices 330 may access the service provider environment 310 in order to access services such as a device shadowing service 370, data storage, and computing processing features. Services operating in the service provider environment 310 may communicate data and messages to the devices 330 in response to requests from the devices 330 and/or in response to computing operations within the services.

The service provider environment 310 may comprise communicatively coupled component systems 340, 342, 346, 350 and 370 that operate to provide services to the devices 330. The gateway server 340 may be configured to provide an interface between the devices 330 and the service provider environment 310. The gateway server 340 receives requests from the devices 330 and forwards corresponding data and messages to the appropriate systems within the service provider environment 310. Likewise, when systems within the service provider environment 310 attempt to communicate data instructions to the devices 330, the gateway server 340 routes those requests to the correct device 330.

The gateway server 340 may be adapted to communicate with varied devices 330 using various different computing and communication capabilities. For example, the gateway server 340 may be adapted to communicate using either TCP (Transmission Control Protocol) or UDP (User Datagram Protocol) protocols. Likewise, the gateway server 340 may be programmed to receive and communicate with the devices 330 using any suitable protocol including, for example, MQTT, CoAP, HTTP, and HTTPS. The gateway server 340 may be programmed to convert the data and instructions or messages received from the devices 330 into a format that may be used by other server systems comprised in the service provider environment 310. In one example, the gateway server 340 may be adapted to convert a message received using the HTTPS protocol into a JSON formatted message that is suitable for communication to other servers within the service provider environment 310.

The gateway server 340 may store, or may control the storing, of information regarding the devices 330 that have formed a connection to the particular gateway server 340 and for which the particular gateway server 340 may be generally relied upon for communications with the device 330. In one example, the gateway server 340 may have stored thereon information specifying the particular device 330 such as a device identifier. For each connection established from the particular device 330, the gateway server 340 may also maintain information identifying the connection. For example, a connection identifier may be generated and stored for each connection established with a particular device 330. Information relating to the particular connection may also be stored. For example, information identifying the particular socket of the gateway server 340 on which the connection was established, as well as information identifying the particular protocol used by the device 330 on the connection may be stored by the gateway server 340. Information such as the socket and protocol may be used in order to facilitate further communications via the particular connection.

In one example, the gateway server 340 may communicate via any suitable networking technology with a device registry server 342. The device registry server 342 may be adapted to track the attributes and capabilities of each device 330. In an example, the device registry sever 342 may be provisioned with information specifying the attributes of the devices 330. The device registry server 342 may comprise data specifying rules or logic (e.g., automation rules) for handling various requests that may be received from the devices 330. The device registry server 342 may be programmed to convert specialized device functions or commands received in particular communication protocols such as, for example HTTPS, MQTT, CoAP, into functions or commands using particular protocols that are understood by other of the servers in the service provider environment 310. In one example, the device registry server 342 may be provisioned with information specifying that upon receipt of a particular request from a particular device 330, a request should be made to store the payload data of the request in a particular network service server 350. The device registry server 342 may be similarly programmed to receive requests from servers 342, 350 and convert those requests into commands and protocols understood by the devices 330.

The device shadowing service server 370 maintains state information for each connected device 330. In an example embodiment, the device shadowing service server 370 maintains for each device 330 that has connected to the service provider environment 310 information specifying a plurality of states. In an example scenario, the device shadowing service server 370 may comprise a recorded state and a desired state. The recorded state represents the existing state of the particular device 330 as presently known to the device shadowing service server 370. The device shadowing service server 370 may be configured to manage groups of device representations and calculate aggregated group states as described earlier. The device shadowing service server 370 communicates with the device gateway 340 in order to communicate requests to update a status to a particular device 330. For example, the device shadowing sever 370 may communicate to the device gateway 340 a sequence of state transition commands that update the status of a device 330. The device gateway 340 may, in response, communicate the appropriate commands formatted for the particular device.

The device security server 346 maintains security-related information for the devices 330 that connect to the service provider environment 310. In one example, the device security server 346 may be programmed to process requests to register devices with the service provider environment 310. For example, entities such as device manufacturers, may forward requests to register devices 330 with the service provider environment 310. The device security server 346 receives registration requests and assigns unique device identifiers to devices 330 which use the device identifiers on subsequent requests to access the service provider environment 310. The device security server 346 stores, for each registered device, authentication information that may be provided during the device registration process. For example, a request to register a device 330 may comprise information identifying the device 330 such as a device serial number and information for use in authenticating the device 330. In one example, the information may comprise a digital certificate and may comprise a public key of a public key-private key pair. The information may be stored in relation to the assigned device identifier for the particular device 330. When the device 330 subsequently attempts to access the service provider environment 310, the request may be routed to the device security server 346 for evaluation. The device security server 346 determines whether authentication information provided in the request is consistent with the authentication information stored in relation to the device identifier and provided during the registration process.

The device security server 346 may be further programmed to process request to associate particular entities (individuals or organizations) with particular devices 330. The device security server 346 may be adapted to receive requests to register entities, which may be, for example, individuals, users, accounts, and/or organizations, as authorized to control or communicate with a particular device 330. In one example, a request may be received from an individual or organization that may have purchased a device 330 from a manufacturer. For example, the device may be a dishwasher, thermostat, or lighting assembly that an individual or organization purchased from the manufacturer. The individual or organization may initiate a request to register the device 330 with the individual or an organization with which the organization is associated. The request may be routed to a web services server which may be comprised in service provider environment 310 or which communicates the request to the service provider environment 310. The request identifies the device 330 and the particular entity (individual or organization) that is requesting to be associated with the device 330. In one example, the request may comprise a unique device identifier that was assigned when the device 330 was registered with the system. The request further may comprise information uniquely identifying the entity that is registering as having authority to communicate with and/or control the particular device 330.

The device security server 346 stores the information identifying the particular entity in relation with the device identifier. When the particular entity subsequently attempts to control or communicate data to the particular device 330, the device security server 346 may use the information to confirm that the particular entity is authorized to communicate with or control the particular device 330. When an entity that has not been registered as being authorized to communicate with the device 330 attempts to communicate with or control the device 330, the device security server 346 may use the information stored in the device security server 346 to deny the request.

A network services server 350 may be any resource or processing server that may be used by any of servers 340, 342, 346, or 370 in processing requests from the devices 330. In one example, network services server 350 may provide data storage and retrieval services and/or on-demand processing capacity. In an example scenario, the network services server 350 may be any of numerous network accessible services including, for example, web or cloud-based services. In one example, the web services server 350 may be programmed to provide particular processing for particular devices 330 and/or groups of devices 330. For example, a network services server 350 may be provisioned with software that coordinates the operation of a particular set of devices 330 that control a particular manufacturing operation.

Servers 340, 342, 346, 350, and 370 may be communicatively coupled via any suitable networking hardware and software. For example, the servers may communicate via a local area network or wide area network.

An external system 360 may access service provider environment 310 for any number of purposes. In one example, an external system 360 may be a system adapted to forward requests to register devices 330 with the service provider environment 310. For example, an external system 360 may include a server operated by or for a device manufacturer that sends requests to service provider environment 310, and device security server 346 in particular, to register devices 330 for operation with service provider environment 310. Similarly, the external system 360 may be a system operated to provide a gateway for entities (individuals or organizations) to register an ownership or control relationship with a particular device 330.

The devices 330 may be any devices that may be communicatively coupled via a network 320 with the service provider environment 310. For example, the devices 330 may be computing devices such as smart phones and tablet computers, automobiles, appliances such as washers and driers, industrial sensors, switches, control systems, etc. In one example, each of devices 330 may communicate over the network 320 to store data reflecting the operations of the particular device 330 and/or to request processing provided by, for example, network services server 350. While FIG. 3 depicts three devices 330, it will be appreciated that any number of devices 330 may access the service provider environment 310 via the gateway server 340. Further it will be appreciated that the devices 330 may employ various different communication protocols. For example, some devices 330 may transport data using TCP, while others may communicate data using UDP. Some devices 330 may use MQTT, while others may use CoAP, and still others may use HTTPs. It will also be appreciated that each of devices 330 may be programmed to send and receive particular functions or commands in its requests that are not compatible with other devices or even the systems within service provider environment 310. The gateway server 340 may be programmed to receive and, if needed, attend to converting such requests for processing with the service provider environment 310.

Figure 4:
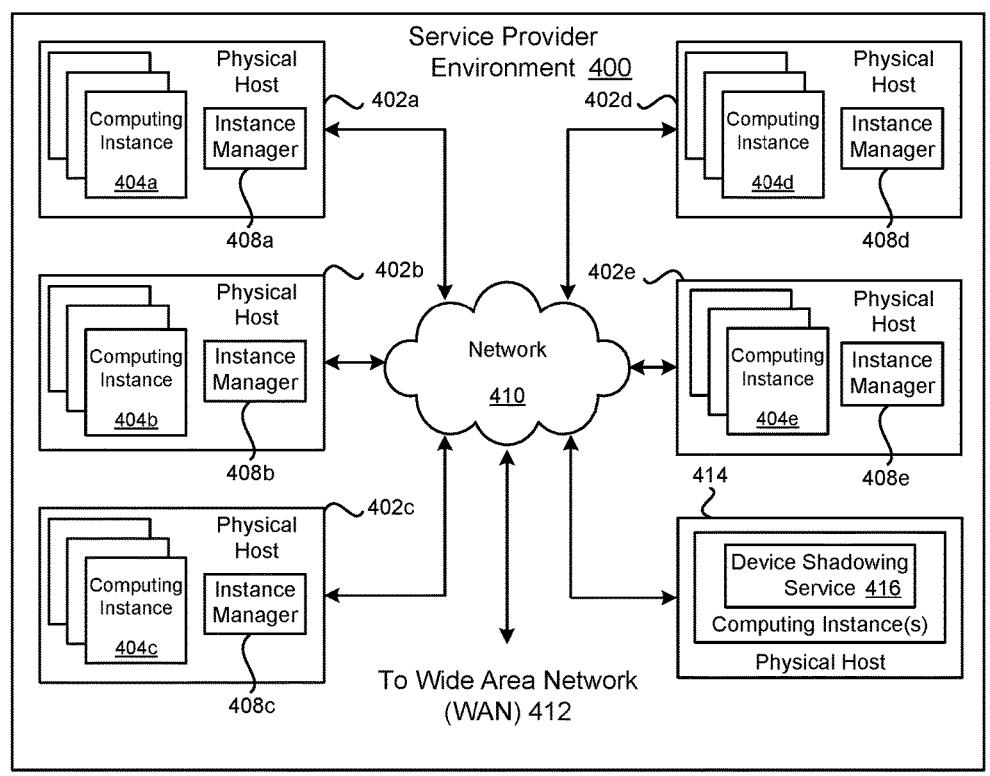
FIG. 4 is a block diagram that illustrates an example service provider environment that includes a device shadowing service.

FIG. 4 is a block diagram illustrating an example service provider environment 400 that may be used to execute and manage a number of computing instances 404a-e. In particular, the service provider environment 400 depicted illustrates one environment in which the technology described herein may be used. The service provider environment 400 may be one type of environment that includes various virtualized service resources that may be used, for instance, to host computing instances 404a-e.

The service provider environment 400 may be capable of delivery of computing, storage and networking capacity as a software service to a community of end recipients. In one example, the service provider environment 400 may be established for an organization by or on behalf of the organization. That is, the service provider environment 400 may offer a "private cloud environment." In another example, the service provider environment 400 may support a multi-tenant environment, wherein a plurality of customers may operate independently (i.e., a public cloud environment). Generally speaking, the service provider environment 400 may provide the following models: Infrastructure as a Service ("IaaS"), Platform as a Service ("PaaS"), and/or Software as a Service ("SaaS"). Other models may be provided. For the IaaS model, the service provider environment 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on a computing service platform provided by the service provider environment 400 without incurring the cost of buying and managing the underlying hardware and software. The SaaS model allows installation and operation of application software in the service provider environment 400. End customers may access the service provider environment 400 using networked client devices, such as desktop computers, laptops, tablets, smartphones, etc. running web browsers or other lightweight client applications, for example. Those familiar with the art will recognize that the service provider environment 400 may be described as a "cloud" environment.

The particularly illustrated service provider environment 400 may include a plurality of physical hosts 402a-e. While six physical hosts are shown, any number may be used, and large data centers may include thousands of physical hosts. The service provider environment 400 may provide computing resources for executing computing instances 404a-e. Computing instances 404a-e may, for example, be virtual machines. A virtual machine may be an instance of a software implementation of a machine (i.e. a computer) that executes applications like a physical machine. In the example of a virtual machine, each of the physical hosts 402a-e may be configured to execute an instance manager 408a-e capable of executing the instances. The instance manager 408a-e may be a hypervisor, virtual machine monitor (VMM), or another type of program configured to enable the execution of multiple computing instances 404a-e on a single physical host. Additionally, each of the computing instances 404a-e may be configured to execute one or more applications.

A physical host 414 may execute a device shadowing service 416 configured to execute the functions described earlier. In one example, the device shadowing service 416 may be hosted by one or more computing instances 404a-e. A network 410 may be utilized to interconnect the service provider environment 400 and the physical hosts 402a-e, 414. The network 410 may be a local area network (LAN) and may be connected to a Wide Area Network (WAN) 412 or the Internet, so that end customers may access the service provider environment 400. The network topology illustrated in FIG. 4 has been simplified, many more networks and networking devices may be utilized to interconnect the various computing systems disclosed herein.

Figure 5:
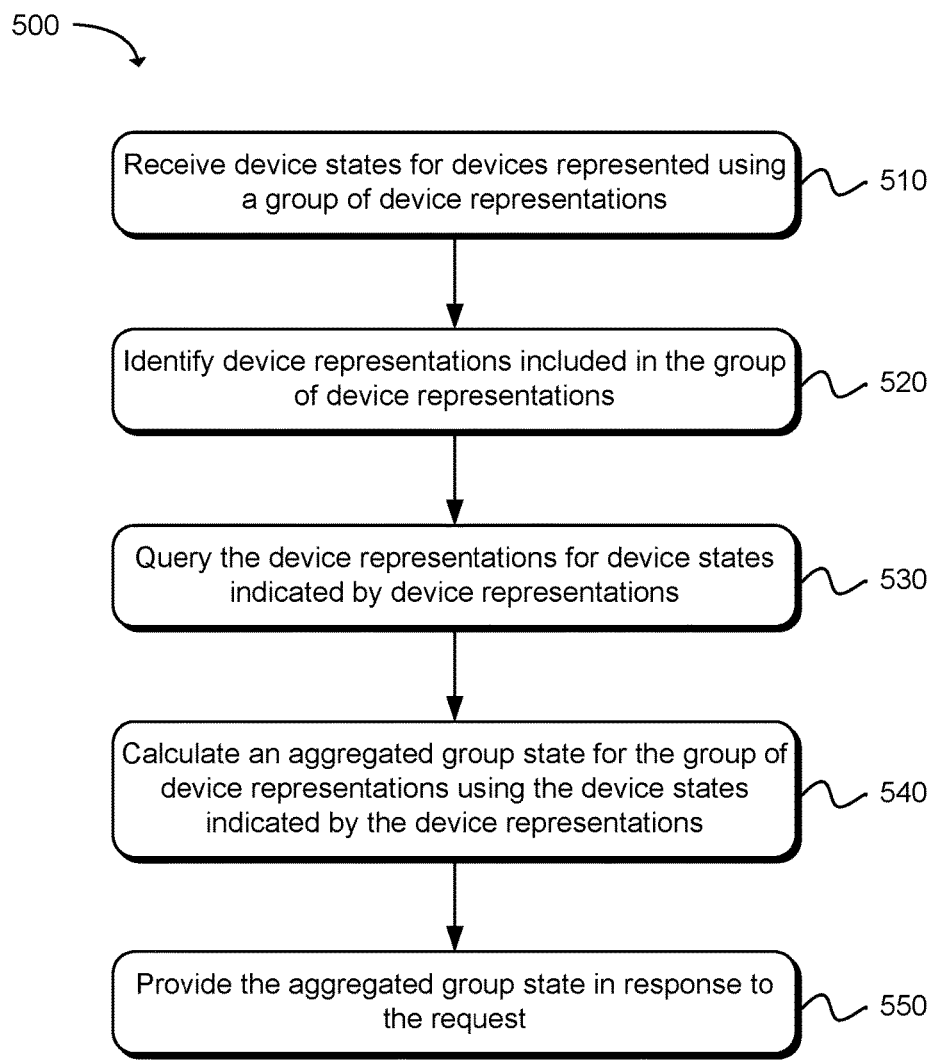
FIG. 5 is a flow diagram illustrating an example method for calculating an aggregated group state for a group of device representations.

FIG. 5 is a flow diagram illustrating an example method 500 for calculating an aggregated group state for a group of device representations. The method 500 may include receiving device states for devices represented using a group of device representations, as in block 510. In one example, the device states may be received at a device shadowing service that manages device states represented by device representations. Devices may connect to the device shadowing service over one or more networks and send information regarding the current state of the device. The device state information sent to the device shadowing service may be represented using a device representation associated with the device. As an illustration, temperature sensor devices configured to send temperature data to a device shadowing service may be distributed over a geographical region. Temperature data sent by an individual device may be represented in a device representation associated with the device. Clients of the device shadowing service may request an aggregated group temperature (e.g., average temperature) for the geographical region from the device shadowing service.

As in block 520, device representations included in the group of device representations may be identified. For example, the request for the aggregated group state may include a group identifier (e.g., a group name) which may be used to identify a group definition or group registry associated with the group of device representations. The group definition or group registry may be used to identify individual device representations included in the group of device representations, which as in block 530, may be queried for device states indicated by the device representations.

As in block 540, the device states obtained from the device representations may be used to calculate an aggregated group state for the group of device representations, and as in block 550, the aggregated group state may be provided to a client in response to the request for the aggregated group state. As an illustration, identifiers for device representations included in a group of device representations for a geographical region may be obtained from a device registry. Each of the device representations may be queried for temperature data provided by respective temperature sensor devices located within the geographical region and the temperature data may be aggregated and sent to a client that requested the aggregated temperature data. For example, aggregation of the temperature data may include: a listing of temperatures with associated device identifiers; an average temperature for the geographical region; temperatures for sub-regions within the geographical region, as well as other types of aggregation.

A request for the aggregated group state may include an identifier for a group of device representations. As an illustration, an API call or message may specify a group name for a group of device representations and a request for an aggregated group state (e.g., "\TrafficMonitorDeviceGroup\AggregatedState"). In response to the request, the cached aggregated group state may be returned to the requester, or the aggregated group state may be calculated as described above and the aggregated group state may be returned to the requester.

Figure 6:
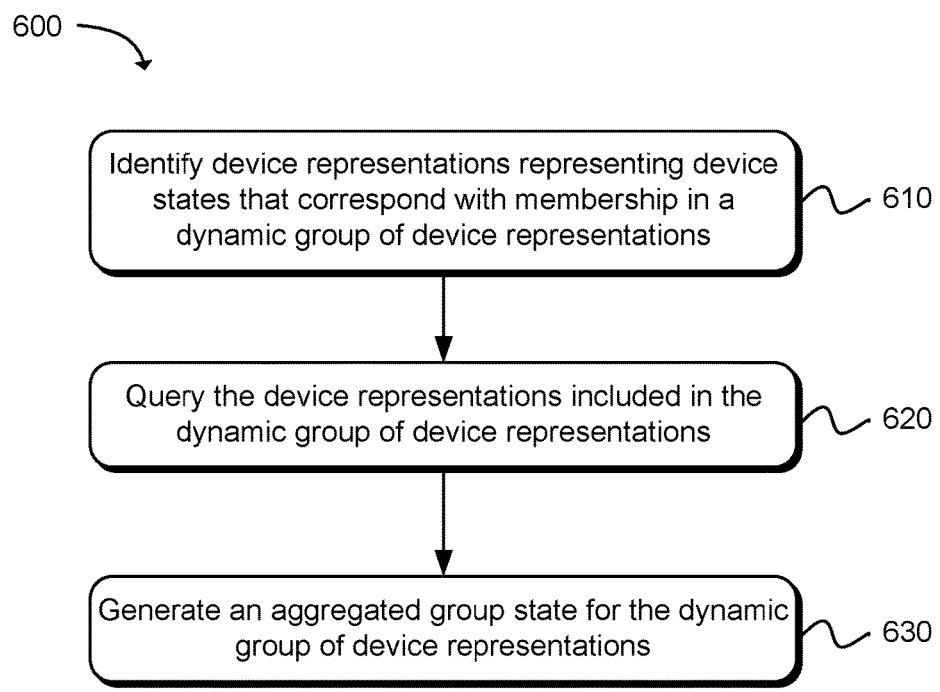
FIG. 6 is a flow diagram illustrating an example method for generating an aggregated group state for a dynamic group of device representations.

FIG. 6 is a flow diagram illustrating an example method 600 for generating an aggregated group state for a dynamic group of device representations. A dynamic group of device representations may include device representations that represent device states that correspond to one or more membership parameters that define the dynamic group of device representations. Membership of a dynamic group of device representations may change as device states represented by the device representations change.

The method 600 may include identifying device representations that are included in a dynamic group of device representations, as in block 610. In one example, a group definition may be used to identify device representations included in a dynamic group of device representations. The group definition may include one or more membership parameters. Device representations managed by a device shadowing service may be queried using the membership parameters to identify device representations that represent device states that correspond to the membership parameters. In one example, the device representations identified may be included in a dynamic group registry or a listing of device representations that may be regenerated in response to state change events associated with the device representations.

As in block 620, the device representations included in the dynamic group of device representations may be queried for device states represented by the device representations, and as in block 630, an aggregated group state for the dynamic group of device representations may be generated. In one example, an aggregated group state may be stored (e.g., in memory or in a data store), such that the aggregated group state may be retrieved in response to a request for the aggregated group state. The aggregated group state may be updated in response to a state change event that results in changing membership of device representations that are included in a dynamic group of representations.

As one example, updating a group registry for a dynamic group of device representations in response to a state change event may result in querying the device representations identified in the dynamic group registry for device states indicated by the device representations. The stored aggregated group state for the dynamic group of device representations may be recalculated using the device states indicated by the device representations identified in the updated group registry.

Figure 7:
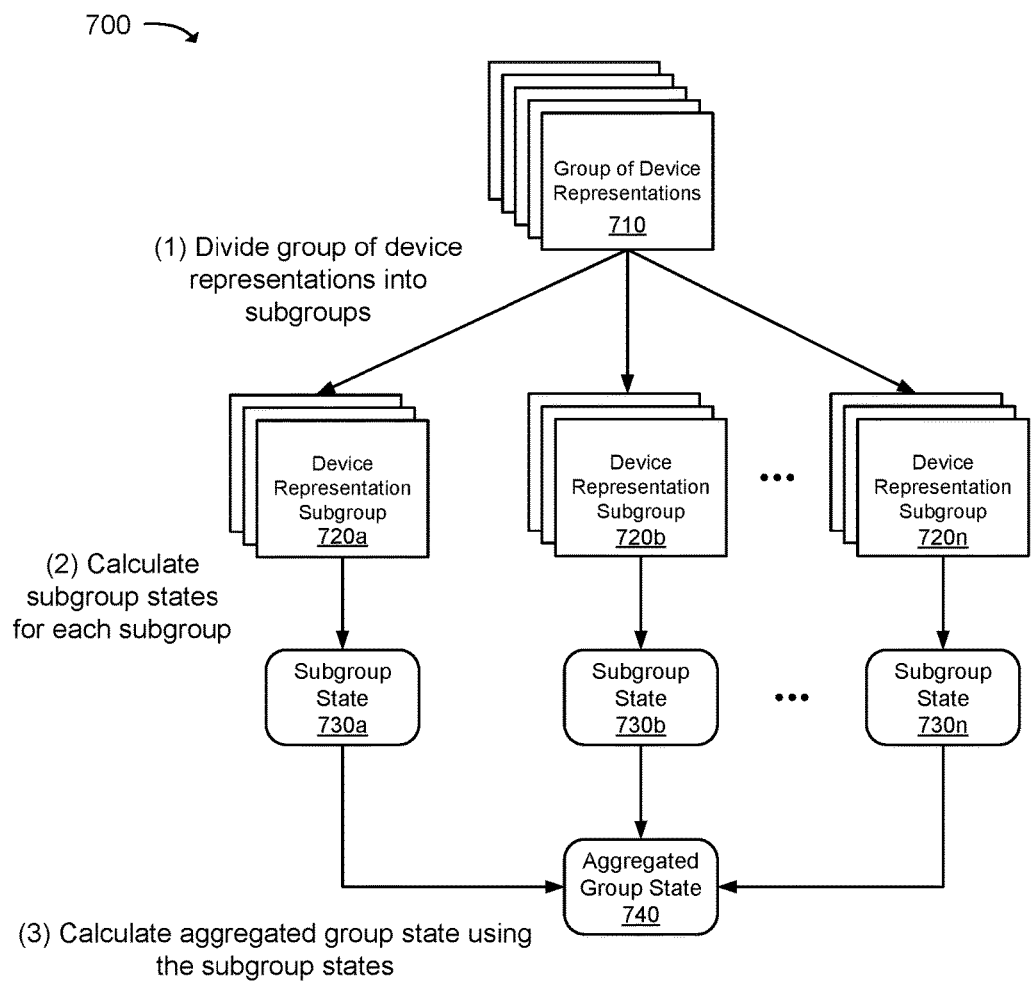
FIG. 7 is a flow diagram that illustrates an example method for calculating an aggregated group state using subgroup states associated with device representation subgroups.

FIG. 7 is a flow diagram that illustrates an example method 700 for calculating an aggregated group state 740 using subgroup states 730*a-n* associated with device representation subgroups. As illustrated, a group of device representations 710 may be divided into a number of device representation subgroups 720*a-n*. Subgroup states 730*a-n* may be calculated for each of the device representation subgroups 720*a-n*. For example, a large group of device representations 710 (e.g., hundreds, thousands, or millions of device representations) may be subdivided into smaller groups that allows for calculating subgroup states 730*a-n* in parallel and the subgroup states 730*a-n* may be combined to generate an aggregated group state 740.

In one example, a group of device representations 710 may be subdivided into device representation subgroups 720*a-n*. Thereafter, definitions for individual device representation subgroups 720*a-n* may be provided to instances of a compute service code configured to calculate subgroup states 730*a-n* for the device representation subgroups 720*a-n* in parallel. That is, an instance of a compute service code may calculate a subgroup state 730*a-n* by using a definition for a device representation subgroup 720*a-n* to identify device representations included in the device representation subgroup 720*a-n* and obtain device states represented by the device representations that are used to calculate the subgroup state 730*a-n*.

In one example, subgroup states 730*a-n* may be calculated and stored in memory and may be periodically recalculated (e.g., in response to state change events associated with device representations included in a device representation subgroup 720*a-n*). As such, an aggregated group state 740 may be calculated by referencing the subgroup states 730*a-n* stored in memory. For example, a group of device representations 710 may comprise a number of device representation subgroups 720a-n for which subgroup states 730a-n may be calculated and stored in memory. The subgroup states 730a-n may be updated in response to changes in device states represented by device representations that are included in the device representation subgroups 720a-n. In some examples, determining whether to update a subgroup state 730a-n may be based on a comparisons between device states represented by device representations included in a device representation subgroup 720a-n, device states as compared to a subgroup state 730a-n for the device representation subgroup 720a-n, device states exceeding a threshold, comparisons of delta changes for individual device representations in a device representation subgroup 720a-n, as well as other device state comparisons. In response to a request for an aggregated group state 740, the subgroup states 730a-n may be retrieved from memory and used to calculate the aggregated group state 740.

As an illustration, a farm operation may include a number of plots containing different varieties of produce that are monitored using moisture sensors that connect to a device shadowing service. Each plot may contain multiple moisture sensors and a subgroup state 730a-n (e.g., an average moisture level) may be calculated for each plot using moisture data represented by device representations for the moisture sensors. The subgroup states 730a-n of the plots may be recalculated as new data is received from the moisture sensors. An average moisture level for the entire farm operation may be obtained by aggregating the subgroup states 730a-n for each of the plots included in the farm operation.

Figure 8:
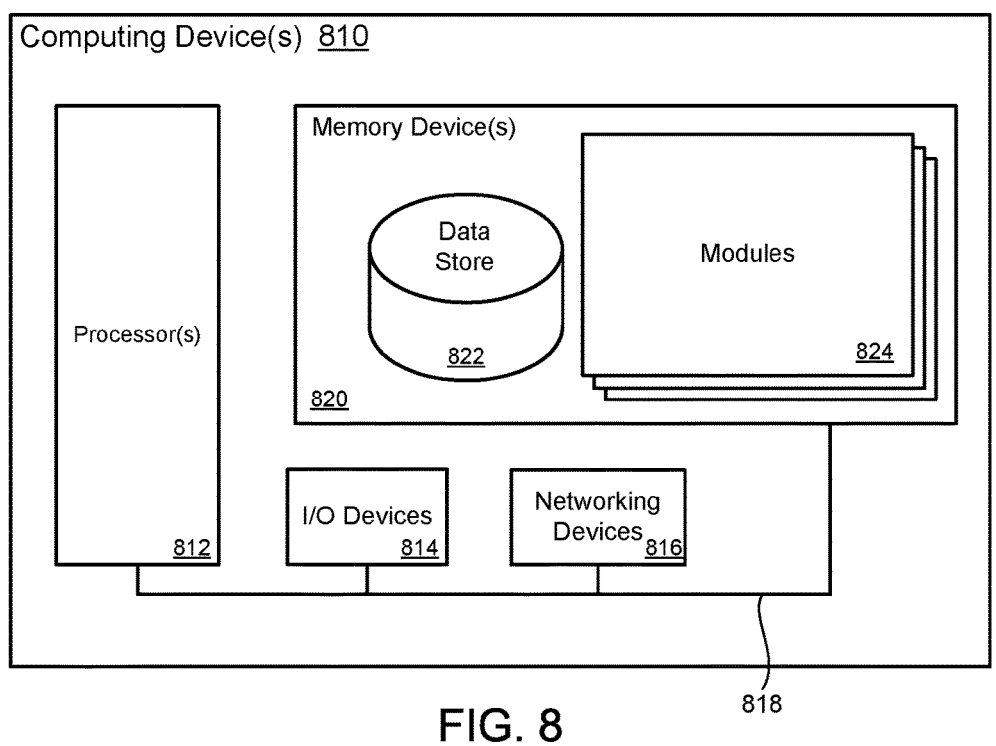
FIG. 8 is block diagram illustrating an example of a computing device that may be used to execute a method for managing groups of devices using device representations.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 824 that are executable by the processor(s) 812 and data for the modules 824. For example, the memory device 820 may include an API interface module, an aggregated group state module, and other modules. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory device 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computer implemented method, comprising:
   receiving device states for devices represented using device representations, wherein the devices connect over a one or more networks to a device shadowing service that manages the device representations which contain the device states;
   updating the device representations to indicate the device states associated with the devices;
   identifying a group of device representations which are grouped using a group definition that includes a membership parameter used to identify device representations that have a device state that correspond to the membership parameter;
   obtaining device states indicated by the device representations included in the group of device representations;
   calculating an aggregated group state for the group of device representations using the device states indicated by the device representations, wherein the aggregated group state includes one or more groupings of states indicated by the device representations; and
   sending the aggregated group state for the group of device representations in response to a request for the aggregated group state.

2. A method as in claim 1, further comprising:
   dividing the group of device representations into a plurality of device representation subgroups; and
   calculating a subgroup state for each of the device representation subgroups, wherein subgroup states are used to calculate the aggregated group state for the group of device representations.

3. A method as in claim 2, further comprising storing the subgroup states in memory wherein the subgroup states for the device representation subgroups are periodically recalculated.

4. A method as in claim 3, further comprising:
   receiving an update to a device state represented by a device representation included in a device representation subgroup; and
   recalculating a subgroup state for the device representation subgroup.

5. A method as in claim 2, further comprising providing a definition for a device representation subgroup to an instance of a compute service code that calculates the subgroup state for the device representation subgroup and combines the subgroup states into the aggregated group state.

6. A method as in claim 1, further comprising providing the group definition for the group of device representations to an instance of a compute service code that calculates the aggregated group state for the group of device representations.

7. A method as in claim 1, further comprising obtaining customer authentication information that is used to identify the device representations in the group of device representations that are accessible to a customer associated with the request.

8. A method as in claim 1, wherein obtaining the device states further comprises querying a group representation that represents the device states associated with the devices.

9. A method as in claim 1, wherein the aggregated group state is a sum, average, mean, median, or mode of the device states indicated by the device representations.

10. A method as in claim 1, exposing an API (Application Programming Interface) call for requesting the aggregated group state associated with a group of device representations.

11. A method as in claim 1, wherein the device representations are stored in one or more key value data stores external to the devices.

12. A system for a device shadowing service that calculates an aggregated group state for a group of device representations, comprising:
    at least one processor;

a memory device including instructions that, when executed by the at least one processor, cause the system to:

receive device states associated with devices configured to connect to the device shadowing service over one or more networks;

update device representations to indicate the device states associated with the devices, wherein the device representations are included in the group of device representations and the device representations are managed by the device shadowing service and include device states associated with the devices;

identify the device representations included in the group of device representations in response to an event associated with the device representations, wherein device representations included in the group of device representations are grouped using a group definition that includes a membership parameter used to identify device representations that have a device state that corresponds to the membership parameter;

query the device representations included in the group of device representations for the device states indicated by the device representations;

calculate the aggregated group state for the group of device representations using the device states indicated by the device representations, wherein the aggregated group state includes one or more groupings of states indicated by the device representations; and provide the aggregated group state in response to a request for the aggregated group state.

13. A system as in claim 12, wherein the aggregated group state comprises at least one grouping of the device states indicated by the device representations.

14. A system as in claim 12, wherein the aggregated group state comprises a statistical calculation of the device states indicated by the device representations.

15. A system as in claim 12, wherein the device states associated with the devices are received in messages published by the devices to named logical channels associated with the device representations, wherein the named logical channels are managed by a publication/subscription broker service configured to send the messages to clients registered to receive the messages.

16. A non-transitory machine readable storage medium having instructions embodied thereon, the instructions when executed by a processor:

receive a request for an aggregated group state for a dynamic group of device representations which represent device states associated with devices that connect over one or more networks to a device shadowing service which manages the device representations that represent the device states;

identify a group definition associated with the dynamic group of device representations, wherein the group definition is based in part on a changeable state included in the device states of the device representations, and includes a membership parameter used to identify device representations having a particular device state that corresponds to the membership parameter;

identify the device representations included in the dynamic group of device representations using the group definition;

query the device representations included in the dynamic group of device representations for the device states indicated by the device representations;

calculate the aggregated group state for the dynamic group of device representations using the device states indicated by the device representations wherein the aggregated group state includes one or more groupings of states indicated by the device representations; and send the aggregated group state in response to the request for the aggregated group state.

17. A non-transitory machine readable storage medium as in claim 16, wherein the instructions that when executed by the processor further generate a group registry that includes identifiers for the device representations included in the dynamic group of device representations.

18. A non-transitory machine readable storage medium as in claim 16, wherein the instructions that when executed by the processor further:

update a group registry for the dynamic group of device representations in response to a state change event associated with a device representation included in the dynamic group of device representations;

query the device representations identified in the group registry for the device states indicated by the device representations; and recalculate the aggregated group state for the dynamic group of device representations using the device states indicated by the device representations identified in the group registry.

* * * * *